United States Patent [19]

Himmelstein

[11] 4,381,684

[45] May 3, 1983

[54] ENERGY EFFICIENT DRIVE SYSTEM

[75] Inventor: Sydney Himmelstein, Lake Bluff, Ill.

[73] Assignee: S. Himmelstein and Company, Hoffman Estates, Ill.

[21] Appl. No.: 91,337

[22] Filed: Nov. 5, 1979

[51] Int. Cl.³ .................... F02B 77/00; B60K 41/10
[52] U.S. Cl. ........................... 74/862; 74/857; 74/752 D; 123/198 F
[58] Field of Search ............... 74/856, 857, 859, 861, 74/862, 872, 873, 865, 866, 752 D; 123/198 F, 481; 364/431, 424.1

[56] References Cited

U.S. PATENT DOCUMENTS

| | | | |
|---|---|---|---|
| 3,713,355 | 1/1973 | Wakamatsu et al. | 74/866 |
| 3,732,753 | 5/1973 | Olsen et al. | 74/866 |
| 3,890,360 | 6/1975 | Pruvot et al. | 60/431 |
| 3,927,528 | 12/1975 | van der Kolk et al. | 60/431 |
| 3,969,614 | 7/1976 | Moyer et al. | 235/150.21 |
| 4,008,567 | 2/1977 | Hirsch | 74/866 X |
| 4,061,055 | 12/1977 | Iizuka et al. | 74/866 |
| 4,064,844 | 12/1977 | Matsumoto et al. | 123/32 EA |
| 4,104,991 | 8/1978 | Abdoo | 123/32 EA |
| 4,107,776 | 8/1978 | Beale | 74/866 X |
| 4,129,109 | 12/1978 | Matsumoto et al. | 123/198 F |
| 4,143,635 | 3/1979 | Iizuka et al. | 123/198 F |
| 4,144,863 | 3/1979 | Abdoo | 123/198 F |
| 4,144,864 | 3/1979 | Kato et al. | 123/198 F |
| 4,157,124 | 6/1979 | Poore | 74/866 |
| 4,198,882 | 4/1980 | Kienlke et al. | 74/866 |
| 4,208,929 | 6/1980 | Heino et al. | 74/866 |
| 4,261,229 | 4/1981 | Mizuno et al. | 74/866 |
| 4,274,306 | 6/1981 | Yokoi et al. | 74/866 |
| 4,285,252 | 8/1981 | Yamaki et al. | 74/866 |
| 4,286,324 | 8/1981 | Ingram | 364/431 X |

FOREIGN PATENT DOCUMENTS 1512106  5/1978  United Kingdom ............. 74/866

Primary Examiner—Leslie A. Braun
Assistant Examiner—Lawrence J. Gotts
Attorney, Agent, or Firm—Wood, Dalton, Phillips, Mason & Rowe

[57] ABSTRACT

An energy efficient drive system having apparatus for determining the load power, load speed, and necessary adjustment of the drive system to obtain a minimum brake specific energy consumption. The drive system includes structure for adjusting the drive in accordance with the determined adjustment. In one form, the drive system includes a variable speed transmission and the adjustment of the drive system is effected by adjusting the transmission in accordance with a determination of the necessary adjusted speed ratio for causing the motive device speed to be a minimum. In one form, the motive device is an internal combustion engine. The adjustment of the drive system to obtain maximum efficiency may alternatively be effected by adjusting the number of active cylinders of the engine. The determination may be made by reference to input information concerning the characteristics of the motive drive. In a modified form, the adjustment is effected by a constant monitoring of the brake specific energy consumption and a resultant adjustment of the drive system to constantly seek the lowest brake specific energy consumption.

17 Claims, 3 Drawing Figures

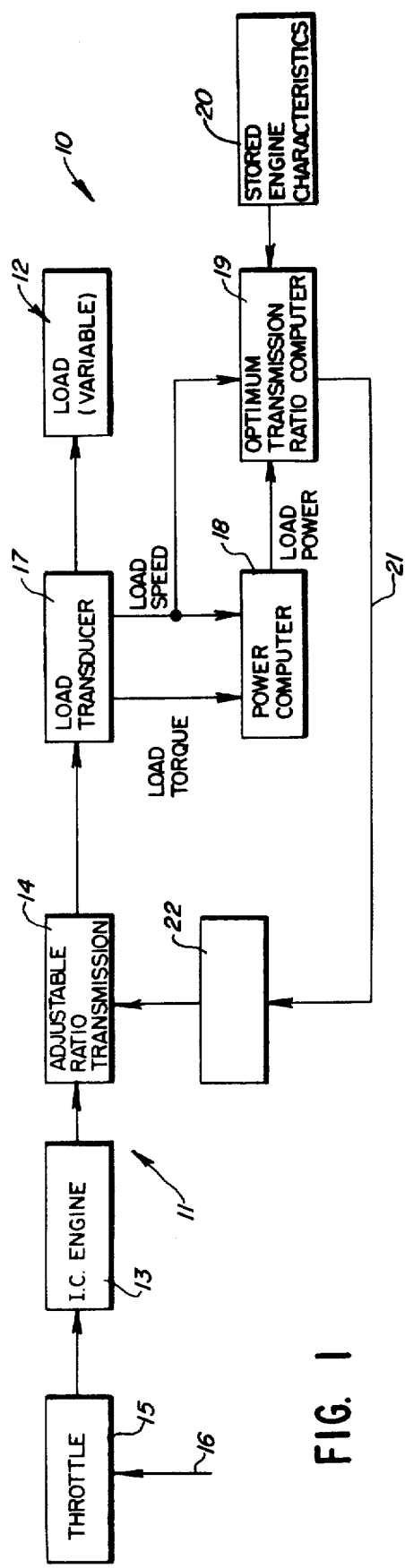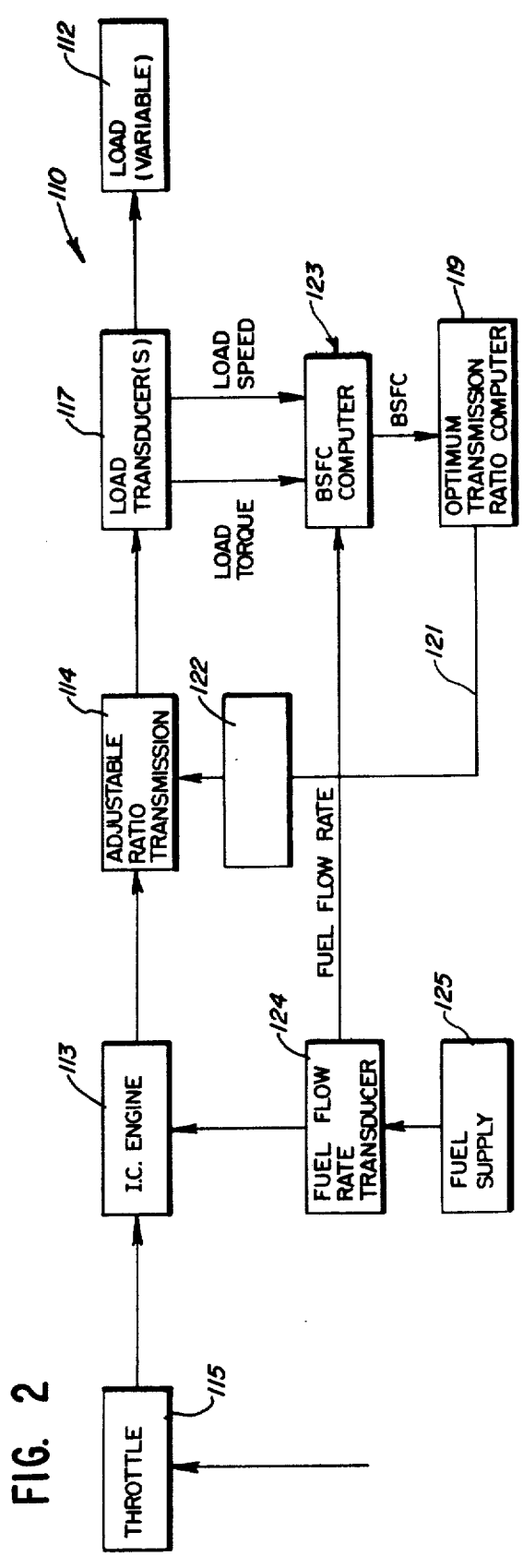
FIG. 1
FIG. 2

ENERGY EFFICIENT DRIVE SYSTEM

BACKGROUND OF THE INVENTION

1. Field of the Invention

This invention relates to drive systems and in particular to means for controlling the energy input to a drive system so as to obtain maximum efficiency thereof.

2. Description of the Prior Art

It is becoming increasingly critical to obtain maximum efficiency in the utilization of energy such as in the operation of drive systems. It has long been known that individual motive devices, such as internal combustion engines and the like, have readily determinable operating characteristics such that an optimum operation of the motive device for a given load power and speed may be determined. While such drive characteristics have been available, no one heretofore has been able to develop suitable control apparatus for efficient utilization of such determinable characteristics.

More specifically, the known systems for increasing efficiency in the utilization of motive drives have utilized a wide range of different apparatuses and methods directed to different parameters of the drive system which, at best, have effected less than effectively maximum efficiency of the drive devices. Illustratively, variations in internal combustion cylinder construction, compression ratios, fuel atomization, etc., have been developed toward the end of improving efficiency in the operation of drive devices, such as internal combustion engine devices. Transmissions have been developed utilizing higher speed gear ratios for permitting the driving of the load at high speed under reduced power requirements with the motor or engine operating at reduced speeds.

SUMMARY OF THE INVENTION

The present invention comprehends an improved system for obtaining effectively maximum efficiency in the operation of a motive device. The improved drive system is advantageously adapted for use in controlling the operation of an internal combustion engine and, thus, is advantageously adapted for improving the efficiency in the utilization of automotive vehicle engines.

In one form, the drive system utilizes means for adjusting the variable transmission of the system in accordance with a determination of load power, load speed, and necessary adjusted speed ratio of the transmission to cause the motive device speed to be a minimum in providing the desired load power and speed.

In another form, where the motive device comprises a multicylinder internal combustion engine, the adjustment of the motive device is effected by adjusting the number of active cylinders in the engine, i.e. the number of cylinders to which fuel is delivered in the operation.

In making the determination, the determined load parameters are correlated with information relative to the operating characteristics of the engine or other motive device such that the control of the drive system is effected by bringing the operation thereof to the point of optimum efficiency indicated by the stored characteristics.

In another form, the brake specific energy consumption is constantly monitored in the use of the drive system and a determination made as to whether the brake specific energy consumption is decreasing or increasing instantaneously. As a result of such determination, the motive drive is adjusted so as to either increase or decrease the transmission gear ratio. Where the adjustment effects a decrease in the brake specific energy consumption, the adjustment is continued in the same direction until the adjustment reversely effects an increase in the brake specific energy consumption whereupon the adjustment is reversed. Such adjustments may be continuously effected so as to maintain the drive system under effectively maximum efficiency operating conditions.

The drive system is adapted for use with loads wherein the power requirements vary at a constant speed as well as where the load power requirements and speed jointly vary. The drive system is advantageously adapted not only for use with spark ignition engines but equally as well for use with compression ignition or diesel engines.

The drive system of the present invention is extremely simple and economical of construction while yet providing highly improved energy efficient operation of such systems in a novel and simple manner.

BRIEF DESCRIPTION OF THE DRAWING

Other features and advantages of the invention will be apparent from the following description taken in connection with the accompanying drawing wherein:

FIG. 1 is a schematic illustration of a drive system embodying the invention;

FIG. 2 is a schematic diagram of a modified form of drive system embodying the invention.

DESCRIPTION OF THE PREFERRED EMBODIMENTS

Figure 3:
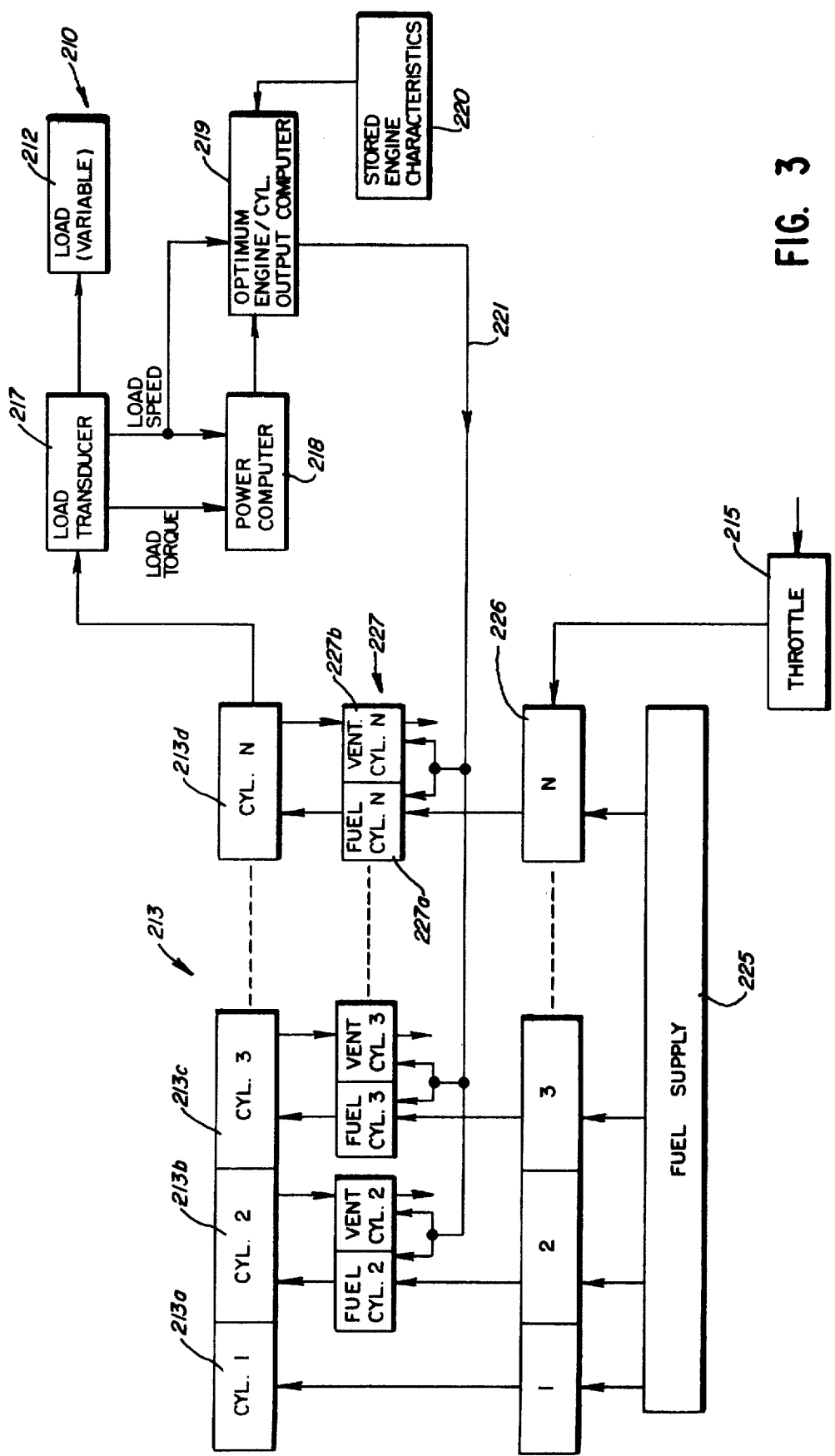
FIG. 3 is a schematic diagram illustrating a further modified form of drive system embodying the invention.

In the exemplary embodiment of the invention as illustrated in FIG. 1 of the drawing, a drive system generally designated 10 is shown to include a power drive generally designated 11 for driving a variable load generally designated 12. In the illustrated embodiment, drive 11 includes a motive device 13 comprising an internal combustion engine, and a variable, adjustable ratio transmission generally designated 14. As indicated above, engine 13 may comprise a spark ignition engine, diesel engine, etc.

As shown in FIG. 1, the output of the engine may be controlled in the normal manner as by a throttle 15, with the input 16 to the throttle being as by the conventional manual means such as by a foot pedal in an automobile. Alternatively, the input may be through a closed loop system utilizing a servomechanism or the like, as will be obvious to those skilled in the art. For an understanding of the invention, however, it is sufficient to consider that the throttle 15 is suitably adjusted to vary the speed of engine 13 in any desired manner. Similarly, the structure of the internal combustion engine forms no part of the present invention and as will be obvious to those skilled in the art, any suitable motive device may be utilized. Further similarly, the specific structure of the adjustable ratio transmission forms no part of the invention, it being obvious to those skilled in the art that any suitable adjustable transmission may be utilized in carrying out the present invention.

As further illustrated in FIG. 1, the drive system structure includes a load transducer for sensing the load power and load speed. As is well known to those skilled in the art, many forms of torquemeters are available for determining the instantaneous load torque and many forms of speedometers are available for determining instantaneous load speed.

As further illustrated in FIG. 1, the sensed load torque and load speed parameters are provided to a computer 18 of conventional construction for providing instantaneous determinations of power from the load torque and load speed inputs. Such computers are well known to those skilled in the art and no further description thereof need be given herein.

The determined load power is delivered to an optimum transmission ratio computer 19. Computer 19 may comprise a conventional computer having stored in its memory information 20 as to the engine characteristics under different speed and load conditions. As discussed above, such engine characteristics are readily determinable by conventional means as well known to those skilled in the art and may be readily provided in the memory of the conventional computer 19 by conventional and standard programming methods.

As is further well known to those skilled in the art, such computers may be utilized to compare input data with stored characteristic data and provide an output corresponding to a determined engine operating condition as a function of the input signals. As shown in FIG. 1, the load speed determination provided from load transducer 17 is delivered to the computer 19 together with the load power determination for correlated comparison with the stored engine characteristics placed in the computer in providing an output ratio command signal generally designated 21. The ratio command signal may be applied to the adjustable transmission 14 as through a suitable transducer 22 for effecting suitable adjustment of the transmission as a function of the ratio command signal sense and magnitude.

Thus, drive system 10, as shown in FIG. 1 of the drawing, utilizes constant determinations of the load torque and load speed by comparing these parameters with the engine characteristics so as to cause the transmission to be suitably adjusted at all times to provide a gear ratio calculated to be the optimum ratio for providing maximum efficiency in the operation of the internal combustion engine for all load torque and speed requirements over the range of operation of the system.

The system effectively determines at all times the lowest brake specific fuel consumption for the operating engine as a function of the previously determined engine characteristics 20.

Turning now to FIG. 2, another form of drive system generally designated 110 embodying the invention is shown to comprise a drive system generally similar to drive system 10 but utilizing a modified means for determining the desired adjustment of the transmission, eliminating the need for obtaining information as to the engine characteristics. The illustrated drive system 110 is similar to drive system 10 in utilizing a throttle 115 for controlling the output of an internal combustion engine 113 which drives a load 112 through an adjustable ratio transmission 114. A load transducer 117 is provided for sensing the load torque and load speed instantaneously and providing this information to a brake specific fuel consumption computer generally designated 123. Computer 123 further receives information as to the fuel rate flow from a fuel flow rate transducer 124 which senses the fuel rate flow delivered from a fuel supply 125 to the engine 113. Such transducers are well known to those skilled in the art and the specific construction thereof forms no part of the present invention.

The computer 123 comprises a conventional computer programmed to correlate the input signals of load torque and load speed to determine load power, and correlate the determined load power and fuel flow rate to calculate instantaneously the brake specific fuel consumption of the system.

The optimum transmission ratio computer 119 receives the output signals from computer 123 comprising the instantaneous brake specific fuel consumption determination. Computer 119 provides a ratio command signal 121 which, acting through a transducer 122, adjusts the transmission 114 in the sense and magnitude of the signal 121. Computer 119, however, is programmed to provide a continuation of the ratio command signal in the same sense as long as the brake specific fuel consumption signal is decreasing. In the illustrated embodiment, computer 119 would continue to provide a ratio command signal 121 tending to adjust transmission 114 so as to permit lower speed operation of the engine 113 in effecting the desired load operation.

When, however, the continuing adjustment of the transmission is determined to effect an increase instantaneously in the brake specific fuel consumption signal delivered to computer 119, the computer causes the ratio command signal 121 to be reversed in sense so as to effect an oppositely directed adjustment of the transmission which, in the illustrated embodiment, would cause an increase in the speed of engine 113 to effect the desired load operation.

Resultingly, computer 119 effects a hunting of the transmission about the optimum setting so as to effectively maintain the engine speed effectively at the point of maximum efficiency of the engine.

Thus, drive system 110 differs from drive system 10 in eliminating the need for determining the engine characteristics and substituting therefor a constant monitoring of the brake specific fuel consumption with the adjustment of the drive system being effected suitably to maintain the brake specific fuel consumption substantially at its minimum value. As a result, the operation of the drive engine is maintained effectively at optimum efficiency continuously in driving the variable load 112.

Referring now to the embodiment of FIG. 3, a drive system generally designated 210 is shown to comprise a drive system generally similar to drive system 10 but wherein adjustment of the drive is effected without the need for an adjustable ratio transmission. In illustrating this form of the invention, the system is shown as utilizing stored engine characteristic means 220 in the manner of utilization of the stored engine characteristic means 20 of system 10, it being understood that the system may equally be utilized with the brake specific fuel consumption control of system 110 in lieu thereof.

Thus, referring to FIG. 3, the internal combustion engine 213 is shown to comprise a multicylinder combustion engine having cylinders 213a, 213b, 213c, etc. up to and including cylinder 213n.

In the embodiment of drive system 210, control of the drive system is by means of selective controlled delivery of the fuel from the fuel supply 225 to the respective cylinders. As illustrated in FIG. 3, the fuel may be delivered to the various cylinders as by a suitable fuel metering pump means 226. Selective delivery of the pumped fuel to the respective cylinders may be controlled by valves generally designated 227 which illustratively may include a fuel flow control portion 227a and a vent control portion 227b. Thus, as shown, the fuel flow control portion selectively passes or prevents flow of fuel from the associated pump to the cylinder and vent control portion 227b is coordinated with the fuel flow portion so as to vent the cylinder whenever the fuel delivery to the cylinder is cut off.

In the illustrated embodiment, cylinder 213a may be directly connected to the pump means 226, thus illustratively providing at least single cylinder operation of the engine at all times in driving the load.

In drive system 210, the load transducer 217 senses the load torque and load speed and provides this information to the power computer 218 which provides its output of the calculated power to the optimum engine cylinder output computer 219 which also receives an input load speed signal.

Computer 219 provides an output ratio command signal 221 for selectively controlling the open and closed conditions of the valves 227. More specifically, if the computer 219 determines, by comparing the instantaneous load speed and power with the stored engine characteristics, that the power capabilities of the engine may be reduced, signal 221 will effect a closing of one or more of the valves 227a so as to cause the engine to be operating at or near optimum efficiency in providing the desired load torque and speed.

In connection with the embodiment of drive system 210, it may be noted that the adjustment of the engine is one of discrete steps as a function of the number of different cylinders made active or inactive as a result of the control of the respective valves 227. In this respect, as will be obvious to those skilled in the art, the transmission means 14 and 114 of embodiments 10 and 110 may comprise transmissions providing discrete steps such as in the conventional stepped gear transmission of automotive vehicles. Alternatively, the transmission may be an infinitely variable transmission of any conventional construction as desired. Further, the transmissions may include infinitely variable portions such as the conventional torque converters utilized in conjunction with conventional gear shifting mechanisms in the automotive art.

The drive system 210 functions similarly to drive system 10, as discussed above, in providing optimum operation of the engine by constantly monitoring the load parameters of torque and speed. The control of the engine may be effected by comparing these parameters with the stored engine characteristics, as illustrated in FIG. 3, or by utilizing the instantaneous brake specific fuel consumption computer means arrangement such as utilized in drive system 110, as desired.

As further will be obvious to those skilled in the art, to avoid excessive hunting in the automatic control such as effected by the use of computer 123, suitable dead band provisions may be incorporated in the computer program for producing the ratio command signal by computer 119.

In the different embodiments illustrated in the drawing, corresponding elements are designated by similar reference numerals but 100 different. As indicated above, the different drive systems function in similar manners except as specifically discussed.

The foregoing disclosure of specific embodiments is illustrative of the broad inventive concepts comprehended by the invention.

I claim:

1. In a drive system having a prime mover and a variable transmission, said drive system being responsive to variable load demand to provide a demanded load power with maximum input energy usage efficiency of the prime mover in producing said demanded load power, the improvement comprising:
means for continuously sensing the actual load power and determining the necessary adjustment of said variable transmission to cause the instantaneous brake specific energy consumption to be a minimum in providing the demanded output load power; and means continuously adjusting said variable transmission in accordance with the determined adjustment to obtain continuously minimum brake specific energy consumption operation of the prime mover for the demanded output load power; said determining means comprises means for determining substantially continuously whether the brake specific energy consumption is decreasing or increasing, and said adjusting means comprises means for continuing the mode of adjustment of the transmission in the event the brake specific energy consumption is determined to be decreasing and oppositely adjusting the transmission when the brake specific energy consumption is determined to be increasing.

2. In a drive system having a drive responsive to variable load demand to provide a demanded load power with maximum input energy usage efficiency in producing said demanded load power, the improvement comprising:
means for continuously determining the actual instantaneous load power;
means for storing information as to the drive characteristics under different speed and load conditions thereof; and
means continuously adjusting said drive in accordance with the determined actual load power and the stored information to cause the instantaneous brake specific energy consumption to be continuously a minimum in providing the demanded load power.

3. The drive system of claim 1 wherein said prime mover comprises an internal combustion engine.

4. The drive system of claim 2 wherein said determining means include means for determining the instantaneous output load torque and output load speed and for converting the determined load torque and speed to a corresponding instantaneous output load power determination.

5. The drive system of claim 1 wherein said prime mover comprises an internal combustion engine and said energy input comprises delivery of fuel to the engine, whereby said brake specific energy consumption comprises brake specific fuel consumption.

6. The drive system of claim 1 or 2 wherein said determining means converts the determined torque and speed to a corresponding instantaneous load power determination.

7. The drive system of claim 1 or 2 wherein said drive comprises means for utilizing fuel as a source of said input energy.

8. The drive system of claim 1 or 2 wherein the drive system comprises an automobile drive system wherein said variable load demands result from different operating conditions of the driven automobile.

9. The drive system of claim 1 wherein said drive system comprises means for using fuel as a source of the input energy and said brake specific energy consumption comprises brake specific fuel consumption.

10. The drive system of claim 1 wherein said drive system comprises means for utilizing the input energy at maximum efficiency at the minimum speed of the prime mover necessary to produce the demanded output load power.

11. The drive system of claim 2 wherein said drive comprises an engine and a variable transmission, said information comprises information as to the operating characteristics of the engine, and said adjusting means comprises means for adjusting the variable transmission.

12. The drive system of claim 2 wherein said drive comprises an engine and a variable transmission, said information comprises information as to the operating characteristics of the engine, and said adjusting means comprises means for adjusting the variable transmission to cause the speed of the engine to be the minimum speed necessary to provide said selected output load power.

13. The drive system of claim 1 wherein the load comprises a device providing a mechanical power output defined by an output load speed and an output load torque.

14. The drive system of claim 1 wherein the load comprises a device providing a mechanical power output defined by an output load speed and an output load torque, said means for determining the brake specific energy consumption comprising means for determining the instantaneous rate of fuel flow to the engine and means for correlating the determined instantaneous actual output load power and the instantaneous rate of fuel flow.

15. The drive system of claim 1 wherein said means for determining the brake specific energy consumption comprises means for determining the actual instantaneous load power and actual instantaneous rate of delivery of input energy to said drive.

16. The drive system of claim 1 wherein said means for continuously determining the actual instantaneous load includes transducer means for sensing the load at the output of the transmission.

17. The drive system of claim 2 wherein said means for continuously determining the actual instantaneous load includes transducer means for sensing the load at the output of the transmission.

* * * * *